United States Patent
Watanabe (10) Patent No.: US 10,054,033 B2
(45) Date of Patent: Aug. 21, 2018

(54) COOLING APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Hiroshi Watanabe, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/188,109

(22) Filed: Jun. 21, 2016

(65) Prior Publication Data
US 2016/0376977 A1 Dec. 29, 2016

(30) Foreign Application Priority Data
Jun. 23, 2015 (JP) ................. 2015-125567

(51) Int. Cl.
*F01P 7/14* (2006.01)
*F01P 7/16* (2006.01)
*F02N 11/08* (2006.01)
*F01P 5/12* (2006.01)
*B60W 30/18* (2012.01)

(52) U.S. Cl.
CPC ....... *F01P 7/16* (2013.01); *F01P 5/12* (2013.01); *F01P 7/167* (2013.01); *F02N 11/0814* (2013.01); *B60W 30/18018* (2013.01); *F01P 2007/146* (2013.01); *F01P 2037/02* (2013.01); *F01P 2060/04* (2013.01); *F01P 2060/045* (2013.01); *F01P 2060/16* (2013.01); *F02N 11/0829* (2013.01)

(58) Field of Classification Search
CPC ...... F01P 7/16; F01P 5/12; F01P 7/167; F01P 2007/146; F01P 2037/02; F01P 2060/04; F01P 2060/045; F01P 2060/16; F02N 11/0814; F02N 11/0829; B60W 30/18018
USPC ................................. 123/41.08
See application file for complete search history.

(56) References Cited

U.S. PATENT DOCUMENTS

| | | | | |
|---|---|---|---|---|
| 5,950,576 A | * | 9/1999 | Busato | F01P 7/16 123/41.08 |
| 6,164,248 A | * | 12/2000 | Lehmann | F01P 5/10 123/41.1 |

(Continued)

FOREIGN PATENT DOCUMENTS

| | | |
|---|---|---|
| EP | 0949095 A1 | 10/1999 |
| JP | 2004-218577 | 8/2004 |
| JP | 4755572 B2 | 8/2011 |

*Primary Examiner* — Hung Q Nguyen
*Assistant Examiner* — Anthony Taylor, Jr.
(74) *Attorney, Agent, or Firm* — Hunton Andrews Kurth LLP (57) ABSTRACT

A cooling apparatus includes a coolant circulation channel for returning a coolant that passes through an engine main body, after causing the coolant to exchange heat with a radiator, device(s) and a heater, respectively. A multifunction valve as a rotary valve that is capable of adjusting an amount of coolant that is circulated to the radiator, device(s) and heater, respectively, is disposed in the coolant circulation channel. When automatic stopping of the engine is performed by idle stop-start control, during the automatic stopping the control apparatus continues to execute valve control of the multifunction valve that is being executed during the operation before the start of the automatic stopping.

7 Claims, 5 Drawing Sheets (56) References Cited

U.S. PATENT DOCUMENTS

| | | | |
|---|---|---|---|
| 6,213,233 B1* | 4/2001 | Sonntag | B60H 1/004 |
| | | | 123/142.5 R |
| 6,539,899 B1* | 4/2003 | Piccirilli | F01P 7/167 |
| | | | 123/41.08 |
| 6,601,545 B1* | 8/2003 | Hohl | B60H 1/03 |
| | | | 123/41.31 |
| 6,681,805 B2* | 1/2004 | McLane | B60H 1/00485 |
| | | | 137/625.16 |
| 7,984,700 B2* | 7/2011 | Chanfreau | B60H 1/00485 |
| | | | 123/41.08 |
| 8,881,693 B2 | 11/2014 | Hayashi et al. | |
| 9,267,420 B2* | 2/2016 | Hayashi | F16K 11/076 |
| 9,297,294 B2* | 3/2016 | Magnier-Cathenod | F01P 7/14 |
| 9,631,547 B2* | 4/2017 | Porras | F01P 7/165 |
| 2004/0069546 A1 | 4/2004 | Lou et al. | |
| 2004/0154671 A1* | 8/2004 | Martins | B60H 1/00485 |
| | | | 137/625.47 |
| 2005/0034688 A1* | 2/2005 | Lelkes | F01P 7/167 |
| | | | 123/41.01 |
| 2006/0048735 A1 | 3/2006 | Umezu et al. | |
| 2010/0131152 A1* | 5/2010 | Castonguay | B60H 1/00778 |
| | | | 701/36 |
| 2010/0186685 A1 | 7/2010 | Hiyama | |
| 2011/0126783 A1* | 6/2011 | Hwang | F01N 5/02 |
| | | | 123/41.1 |
| 2013/0054060 A1 | 2/2013 | Dupuy | |
| 2014/0257676 A1* | 9/2014 | Santoso | F02D 45/00 |
| | | | 701/112 |
| 2017/0096930 A1* | 4/2017 | Murai | F01P 7/16 |
| 2017/0198628 A1* | 7/2017 | Spiess | F01P 7/167 |

* cited by examiner

COOLING APPARATUS FOR INTERNAL COMBUSTION ENGINE

CROSS-REFERENCE TO RELATED APPLICATION

The present application claims priority to Japanese Patent Application No. 2015-125567 filed on Jun. 23, 2015, which is incorporated herein by reference in its entirety.

TECHNICAL FIELD

Embodiments of the present invention relate to a cooling apparatus for an internal combustion engine.

BACKGROUND

Japanese Patent No. 4755572 discloses a system that includes a heat accumulator for storing/circulating engine cooling water in an engine cooling water circulation circuit that connects an engine and a heater core of an air-conditioning unit. An engine-side valve is disposed in a communication portion between an outlet/inlet on the engine side and an inlet on the heat accumulator side in the engine cooling water circulation circuit. Further, a heater-side valve is disposed in a communication portion between an outlet/inlet on the heater core side and an outlet on the heat accumulator side.

In the system disclosed in Japanese Patent No. 4755572, which includes the above-described engine cooling water circulation circuit, four modes, namely, a "heat accumulation mode", a "heat accumulation maintaining mode", an "engine immediate warming mode" and a "in-cabin immediate warming mode", can be selected by switching the aforementioned valves. Specifically, when the engine is stopped, the "heat accumulation maintaining mode" is selected that blocks the outlet/inlet on the heat accumulator side by placing both of the engine-side valve and the heater-side valve at a closed position so that high-temperature engine cooling water is thermally insulated and stored inside the heat accumulator.

LIST OF RELATED ART

Following is a list of patent literatures which the applicant has noticed as related arts of the present invention.
[Patent Literature 1]
 Japanese Patent No. 4755572
[Patent Literature 2]
 Japanese Patent Laid-Open No. 2004-218577

SUMMARY

Systems are known that perform automatic stopping and restarting of an engine in accordance with the operating state thereof. Examples of such systems include a system that performs idling stop-and-start control (hereunder, also referred to as an "S&S system"), and a system that performs an operation that intermittently stops an engine in a hybrid vehicle (hereunder, also referred to as an "HV intermittent stop system"). In a vehicle in which such a system is mounted, the engine is stopped when a predetermined stopping condition is established, and the engine is restarted when a predetermined restarting condition is established while the engine is stopped.

In this respect, according to the system disclosed in Japanese Patent No. 4755572, when automatic stopping and restarting of an engine is performed by the aforementioned S&S system or HV intermittent stop system, upon the engine being automatically stopped, a valve is actuated to move the valve to a closed position, and upon the engine being restarted thereafter, the valve is returned again to the original position thereof. Here, time is required until the state of cooling water that flows through the engine cooling water circulation circuit becomes an intended state, and consequently there is a concern that the controllability of the cooling apparatus will deteriorate.

Embodiments of the present invention address the above described problem, and an object of embodiments of the present invention is to provide a cooling apparatus for an internal combustion engine that can suppress a deterioration in the controllability of a cooling apparatus that is caused by short-time engine stopping in an internal combustion engine in which automatic stopping for a short time and restarting of the engine is performed.

In accomplishing the above objective, according to a first embodiment of the present invention, there is provided a cooling apparatus for an internal combustion engine configured to be capable of executing an automatic stop/start control that automatically stops the internal combustion engine where a predetermined stopping condition is established, and automatically starts the internal combustion engine where a predetermined restarting condition is established during automatic stopping, the cooling apparatus comprising:
 a first coolant circulation channel for returning a coolant that passes through a main body of the internal combustion engine to the main body after causing the coolant to exchange heat with a first heat exchanger;
 an electric-motor-driven valve that is provided partway along the first coolant circulation channel; and
 a control apparatus configured to be capable of executing a first control that actuates the valve in accordance with a temperature of the coolant during operation of the internal combustion engine, and a second control that actuates the valve during complete stopping of the internal combustion engine;
 wherein the control apparatus is configured so that, where automatic stopping is performed by the automatic stop/start control during execution of the first control, the control apparatus continues to execute the first control during the automatic stopping.

According to a second embodiment of the present invention, there is provided a cooling apparatus for an internal combustion engine according to the first embodiment, wherein the first control includes temperature control that actuates the valve so as to bring the temperature of the coolant near to a target temperature.

According to a third embodiment of the present invention, there is provided a cooling apparatus for an internal combustion engine according to the first embodiment, further comprising:
 an electric water pump that circulates coolant in the first coolant circulation channel,
 wherein the control apparatus is configured to drive the electric water pump during execution of the first control.

According to a fourth embodiment of the present invention, there is provided a cooling apparatus for an internal combustion engine according to the first embodiment, wherein the first control includes warm-up control that, where the temperature of the coolant is lower than a predetermined warm-up temperature, actuates the valve so that circulation of the coolant in the first coolant circulation channel is stopped.

According to a fifth embodiment of the present invention, there is provided a cooling apparatus for an internal combustion engine according to the first embodiment, further comprising:

a second coolant circulation channel for returning a coolant that passed through the main body to the main body after causing the coolant to exchange heat with a second heat exchanger;

wherein:

the valve is provided partway along the second coolant circulation channel;

the valve is configured as a rotary valve that comprises therein a rotatable rotor, and is configured so that a first opening degree on the first coolant circulation channel side and a second opening degree on the second coolant circulation channel side change in accordance with a rotational position of the rotor; and the first control includes auxiliary equipment control that adjusts the second opening degree in response to a request to circulate coolant in the second heat exchanger.

According to a sixth embodiment of the present invention, there is provided a cooling apparatus for an internal combustion engine according to the fifth embodiment, wherein the rotary valve is configured to change each of the first opening degree and the second opening degree from a fully-open opening degree to a fully-closed opening degree by rotating the rotor from a reference position at which both of the first opening degree and the second opening degree become the fully-open opening degree, and to change each of the first opening degree and the second opening degree from the fully-closed opening degree to the fully-open opening degree by further rotating the rotor;

the cooling apparatus further comprising a retaining apparatus that, where automatic stopping by the an automatic stop/start control is performed during execution of the first control, if the rotational position of the rotor is a water stoppage position at which both of the first opening degree and the second opening degree become the fully-closed opening degree, retains the rotational position of the rotor at the water stoppage position during the automatic stopping.

According to a seventh embodiment of the present invention, there is provided a cooling apparatus for an internal combustion engine according to the first embodiment, wherein the automatic stop/start control includes idling stop-and-start control.

According to the first embodiment of the present invention, a cooling apparatus includes: a first coolant circulation channel that causes a coolant that passes through a main body to exchange heat with a first heat exchanger and thereafter returns the coolant to the main body; an electric-motor-driven valve that is provided partway along the first coolant circulation channel; and a control apparatus configured to be capable of executing a first control that actuates the valve in accordance with a temperature of the coolant during operation of an internal combustion engine, and a second control that actuates the valve during complete stopping of the internal combustion engine. The control apparatus is configured so that, where automatic stopping is performed by automatic stop/start control during execution of the first control, the control apparatus continues to execute the first control during the automatic stopping. Therefore, according to this embodiment of the present invention, since a valve operation that is in accordance with the temperature of a coolant is performed during automatic stopping of an internal combustion engine, a deterioration in the controllability of the cooling apparatus when restarting the internal combustion engine after automatic stopping can be suppressed.

According to the second embodiment of the present invention, where automatic stopping is performed when temperature control that brings the temperature of the coolant near to a target temperature is being executed, the temperature control is continued during automatic stopping. Therefore, according to this embodiment of the present invention, the temperature of the coolant can be promptly brought near to a target temperature where the internal combustion engine is restarted.

According to the third embodiment of the present invention, an electric water pump that is provided in the first coolant circulation channel is driven during execution of the temperature control. Therefore, according to this embodiment of the present invention, since coolant can be circulated in the first coolant circulation channel during automatic stopping of the internal combustion engine also, a deterioration in the controllability of the cooling apparatus when restarting the internal combustion engine after automatic stopping can be suppressed.

According to the fourth embodiment of the present invention, when automatic stopping is performed where warm-up control that stops circulation of the coolant in the first coolant circulation channel to perform warm-up is being executed, the warm-up control is continued during the automatic stopping. Therefore, according to this embodiment of the present invention, since circulation of coolant is stopped during automatic stopping of the internal combustion engine also, a deterioration in the controllability of the cooling apparatus when the internal combustion engine is restarted can be suppressed.

According to the fifth embodiment of the present invention, the valve is configured as a rotary valve that includes a rotor. In a rotary valve, time is required for a rotational operation of the rotor. According to this embodiment of the present invention, since the first control is continued during automatic stopping of the internal combustion engine also, the rotor of the rotary valve is operated by a large amount when the internal combustion engine is restarted after automatic stopping, and thus a deterioration in the controllability of the cooling apparatus can be suppressed. Further, according to this embodiment of the present invention, since a valve operation is performed in response to a request to circulate the coolant in a second heat exchanger during automatic stopping of the internal combustion engine also, a deterioration in the controllability of the cooling apparatus when the internal combustion engine is restarted after automatic stopping can be suppressed.

According to the sixth embodiment of the present invention, when automatic stopping is performed, where the rotational position of the rotor of the rotary valve is a water stoppage position at which both of a first opening degree and a second opening degree are a fully-closed opening degree, the rotor is retained at the water stoppage position during automatic stopping. The rotational position of the rotor that is the water stoppage position is a position at which rapid operation of the rotor is possible when performing an operation to open either of the first opening degree and the second opening degree. Therefore, according to this embodiment of the present invention, when restarting the internal combustion engine, the controllability of the cooling apparatus can be improved and fuel consumption can be enhanced.

According to the seventh embodiment of the present invention, a deterioration in the controllability of the cooling apparatus can be suppressed during automatic stopping and a time of restarting in accordance with idling stop-and-start control.

DETAILED DESCRIPTION

Embodiments of the present invention are described hereunder with reference to the accompanying drawings. However, it is to be understood that even when the number, quantity, amount, range or other numerical attribute of an element is mentioned in the following description of the embodiments, the present invention is not limited to the mentioned numerical attribute of the embodiment unless it is expressly stated or theoretically defined. Further, structures or steps described in conjunction with the following embodiments are not necessarily essential to the present invention unless expressly stated or theoretically defined.

First Embodiment

A first embodiment of the present invention will be described referring to the drawings.

Configuration of First Embodiment

Figure 1:
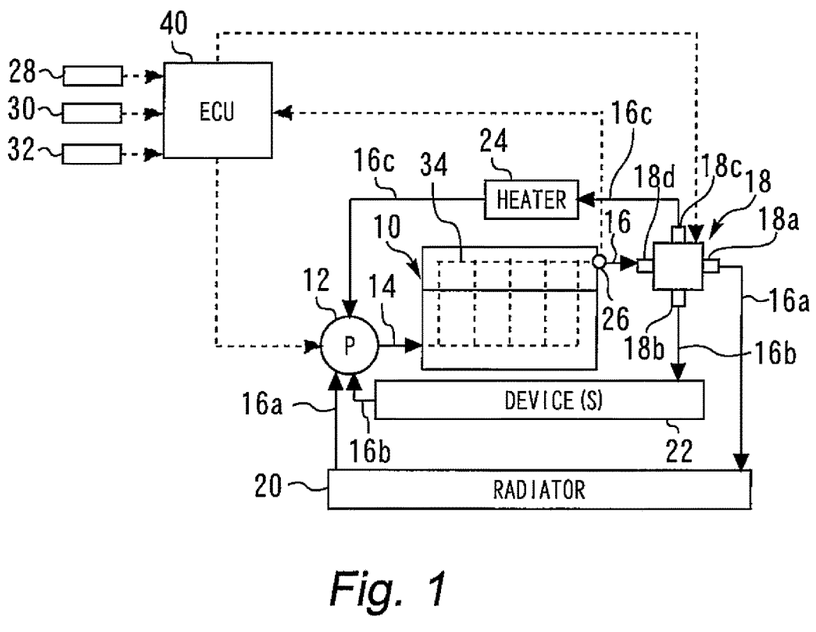
FIG. 1 is a view for describing a configuration of a coolant apparatus of a first embodiment of the present invention.

FIG. 1 is a view for describing a configuration of a coolant apparatus of a first embodiment of the present invention. As shown in FIG. 1, the coolant apparatus of the present embodiment includes an engine 10 as an internal combustion engine to be mounted in a vehicle. A water jacket 34 is provided in a main body (cylinder block or cylinder head) of the engine 10. Heat exchange is performed between a coolant (cooling water) that flows through the water jacket 34 and the engine 10.

The coolant that flows through the water jacket 34 is supplied from an electric-motor-driven water pump 12. The water pump 12 includes an impeller that feeds the coolant by rotating, and a motor that rotates the impeller (the impeller and the motor are not shown in the drawings). A flow rate and discharge pressure of the coolant that is discharged from the water pump 12 is changed by electrically controlling the rotation of the motor.

An inlet portion of the water jacket 34 and a discharge port (not shown) of the water pump 12 are connected by a supply channel 14. A return channel 16 is connected to an outlet portion of the water jacket 34. The return channel 16 branches into three channels 16a to 16c along the way. The branch channels 16a to 16c are independently connected to intake ports (not shown) of the water pump 12. That is, the coolant apparatus of the present embodiment includes three coolant circulation channels in which the supply channel 14, the water jacket 34, and the return channel 16 are common, and the branch channels 16a 16c are independent.

A first circulation channel is a channel that circulates coolant to a radiator 20 that is provided along the branch channel 16a, and is constituted by the supply channel 14, the return channel 16 and the branch channel 16a. During circulation of coolant to the radiator 20, heat exchange is performed between outside air and the coolant. A second circulation channel is a channel that circulates coolant to device(s) 22 provided along the branch channel 16b, and is constituted by the supply channel 14, the return channel 16 and the branch channel 16b. An oil cooler, an EGR cooler and a heat exchanger such as an ATF (automatic transmission fluid) warmer are included in the device(s) 22. During circulation of the coolant to the device(s) 22, heat exchange is performed between the coolant and a fluid (for example, oil or EGR gas) that flows through the device(s) 22. A third circulation channel is a channel that circulates coolant to the heater 24 as a heat exchanger for vehicle cabin air conditioning that is provided along the branch channel 16c, and is constituted by the supply channel 14, the return channel 16 and the branch channel 16c. During circulation of coolant to the heater 24, heat exchange is performed between the coolant and air for heating a vehicle cabin. Note that, in the following description, heat exchangers other than the radiator 20 that the coolant apparatus includes, such as the device(s) 22 and the heater 24 are referred to collectively as "auxiliary equipment".

A multifunction valve 18 that is configured as a rotary valve is provided at a portion at which the first to third circulation channels branch, that is, a portion at which the return channel 16 branches into the branch channels 16a to 16c. The multifunction valve 18 includes a valve body that has discharge ports 18a to 18c and an inflow port 18d, a rotor that is housed so as to be freely rotatable around a rotary shaft inside the valve body, and a motor that rotates the rotor (none of the aforementioned components are shown in the drawings). During rotation of the rotor by the motor, an opening area between the respective discharge ports and the inflow port 18d changes, and a communicating state between the respective discharge ports and the inflow port 18d also changes. That is, the opening area of the respective branch channels changes and an open/closed state (opening degree) of each branch channel changes. By means of the multifunction valve 18, the flow rate of coolant that flows to each branch channel, an allocation of heat to heat exchangers in the respective branch channels, and a temperature of coolant that is circulated through the inside of the coolant apparatus can be controlled.

The coolant apparatus of the present embodiment also includes an ECU (electronic control unit) 40 as a control apparatus. The ECU 40 includes at least an input/output interface, a memory and a CPU. The input/output interface is provided in order to take in sensor signals from various sensors, and to also output actuating signals to actuators. The sensors from which the ECU 40 takes in signals include, e.g., a temperature sensor 26 that is provided at an outlet portion of the water jacket 34 and that detects the temperature of coolant that flows out from the main body, a crank angle sensor 28 for detecting a speed of the engine 10, an accelerator opening degree sensor 30 for detecting an accelerator opening degree, and a switch 32 for switching the heater as vehicle cabin air conditioning on or off. The actuators to which the ECU 40 sends an actuating signal include a motor of the above described water pump 12 and a motor of the multifunction valve 18. A control program that defines an opening degree schedule that is described later, and various maps are stored in the memory. The CPU reads out, e.g., a control program from the memory and executes the control program, and generates actuating signals based on sensor signals that are taken in.

Operations of First Embodiment (Idling Stop-and-Start Control)

In the system of the first embodiment, idling stop-and-start control of the engine 10 is included in the control that the ECU 40 executes. The idling stop-and-start control is control that automatically stops the engine 10 if a predetermined stopping condition is established, and thereafter restarts the engine 10 if a predetermined restarting condition is established while the engine is stopped. The predetermined stopping condition and the predetermined restarting condition are set arbitrarily. Since idling stop-and-start control is already known and is described in a large amount of literature, a detailed description thereof is omitted herein.

The automatic stopping according to the aforementioned idling stop-and-start control is stopping in a state in which the ignition is kept turned on, and a stopping time period is a comparatively short time of several seconds or several minutes. In the following description, automatic stopping of the engine 10 in a state in which the ignition is kept turned on by, e.g., idling stop-and-start control is referred to as "short-time engine stopping", and complete stopping of the engine by turning off the ignition is referred to as "normal engine stopping".

(Valve Control Using Multifunction Valve)

The multifunction valve 18 can control the open/closed state of each branch channel based on an operation plan of the rotor that is set in association with a rotation angle from a reference position of the rotor (hereunder, referred to as "rotation angle of the rotor"). Hereunder, an operation plan will be described referring to FIG. 2.

Figure 2:
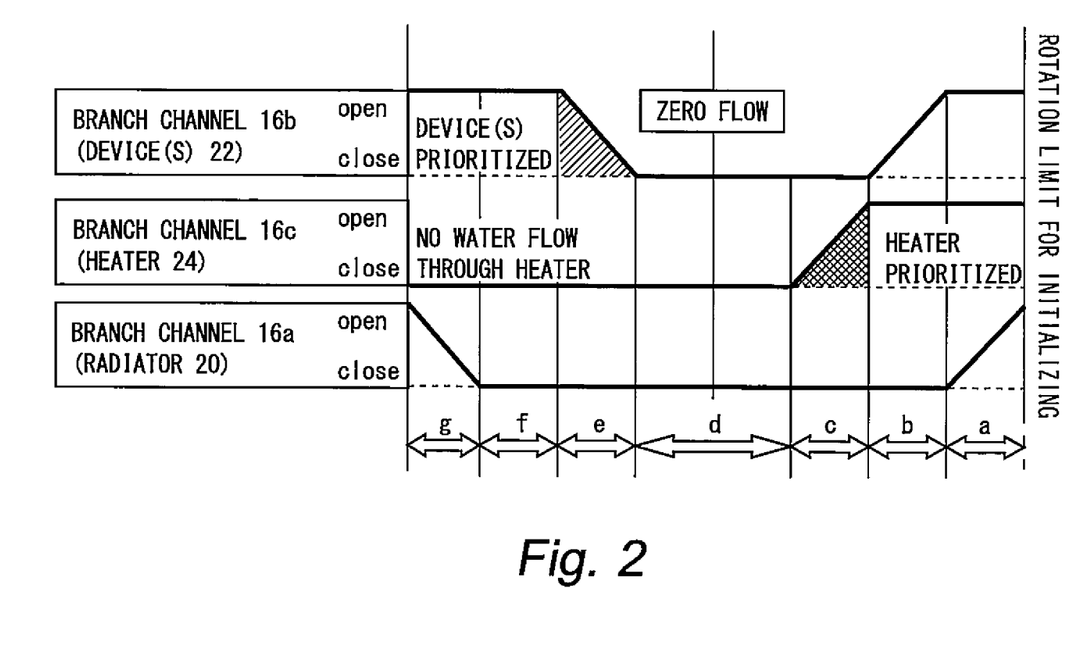
FIG. 2 is a view illustrating an operation plan of a rotor of a multifunction valve.

FIG. 2 is a view that illustrates an operation plan of the rotor of the multifunction valve 18. The abscissa axis in FIG. 2 represents a rotation angle of the rotor, and the axis of ordinates represents changes in the open/closed state of the respective branch channels. In FIG. 2, a region d is a water stoppage position (zero flow) at which the flow rate of coolant flowing in all of the branch channels is zero. During rotation of the rotor to advance in the rightward direction from the region d, the rotation angle of the rotor shifts to a region c that is adjacent to the region d. In the region c, the branch channel 16c starts to open and coolant begins to pass through the heater 24. If the rotor is rotated further from this position, the branch channel 16c opens completely, and the rotation angle of the rotor shifts to a region b that is adjacent to the region c. In the region b, the branch channel 16b starts to open in a state in which the branch channel 16c is completely open, and coolant begins to pass through the device(s) 22. If the rotor is rotated further from this position, the branch channel 16b opens completely, and the rotation angle of the rotor shifts to a region a that is adjacent to the region b. In the region a, the branch channel 16a starts to open in a state in which the branch channel 16c and branch channel 16b are completely open, and coolant begins to pass through the radiator 20. If the rotor is rotated further from this position, the branch channel 16a opens completely. Note that a position of the rotation angle of the rotor at which the branch channel 16a is completely open corresponds to a rotation limit of the rotor, and the operation plan is formulated taking the rotation limit as the above-described reference position.

Note that, in FIG. 2, if the rotor is rotated to advance in the leftward direction from the region d, the rotor will shift to a region e that is adjacent to the region d. In the region e, the branch channel 16b starts to open, and coolant starts to pass through the device(s) 22. If the rotor is rotated further from this position, the branch channel 16b opens completely and the rotation angle of the rotor shifts to a region f that is adjacent to the region e. In the region f, only the branch channel 16b opens, and coolant only passes through the device(s) 22. If the rotor is rotated further from this position, the rotation angle of the rotor shifts to a region g that is adjacent to the region f. In the region g, the branch channel 16a starts to open in a state in which the branch channel 16b is completely open, and coolant begins to pass through the radiator 20. If the rotor is rotated further from this position, the branch channel 16a opens completely.

In the system of the present embodiment, the ECU 40 executes valve control that controls the rotation angle of the rotor of the multifunction valve 18 in accordance with the operating state of the engine 10 and the operating state of the auxiliary equipment. The valve control that the ECU 40 is capable of executing includes operating-time control that actuates the multifunction valve 18 in accordance with the temperature of the coolant when the engine 10 is operating, and normal engine stopping-time control that actuates the multifunction valve 18 during normal engine stopping. These two kinds of control are described in detail hereunder.

(Regarding Operating-Time Control)

The operating-time control includes temperature control for regulating the temperature of the coolant, warm-up control for raising the coolant temperature during warming up, and auxiliary equipment control for controlling operation of the auxiliary equipment. The warm-up control is performed when the engine 10 is warming up, and specifically, is control that controls the opening degree of the branch channel 16a. In the warm-up control, the ECU 40 causes the rotor of the multifunction valve 18 to operate within a range from the region b to the region f during a period until the coolant temperature that is detected by the temperature sensor 26 reaches a predetermined warm-up temperature. Note that, as the predetermined warm-up temperature, a value (for example, 80° C.) is used that is determined in advance as a temperature at which it can be determined that warming up of the engine 10 is completed. By this means, since the opening degree of the branch channel 16a is completely closed (closed fully), circulation of coolant to the radiator 20 is restricted.

After the coolant temperature reaches the predetermined warm-up temperature, the control transitions from the warm-up control to temperature control. The temperature control is control that regulates the temperature of the engine cooling water of the engine 10, and controls the opening degree of the branch channel 16a in accordance with the temperature of the coolant. More specifically, according to the temperature control, the ECU 40 drives the water pump 12 and also controls the rotation angle of the rotor of the multifunction valve 18 within the range of the region a or the region g so that the temperature of the coolant approaches a target temperature. By this means, the opening area of the branch channel 16a can be changed to adjust the amount of coolant that circulates to the radiator 20, and hence the temperature of the engine cooling water that is the coolant can be regulated.

Figure 3:
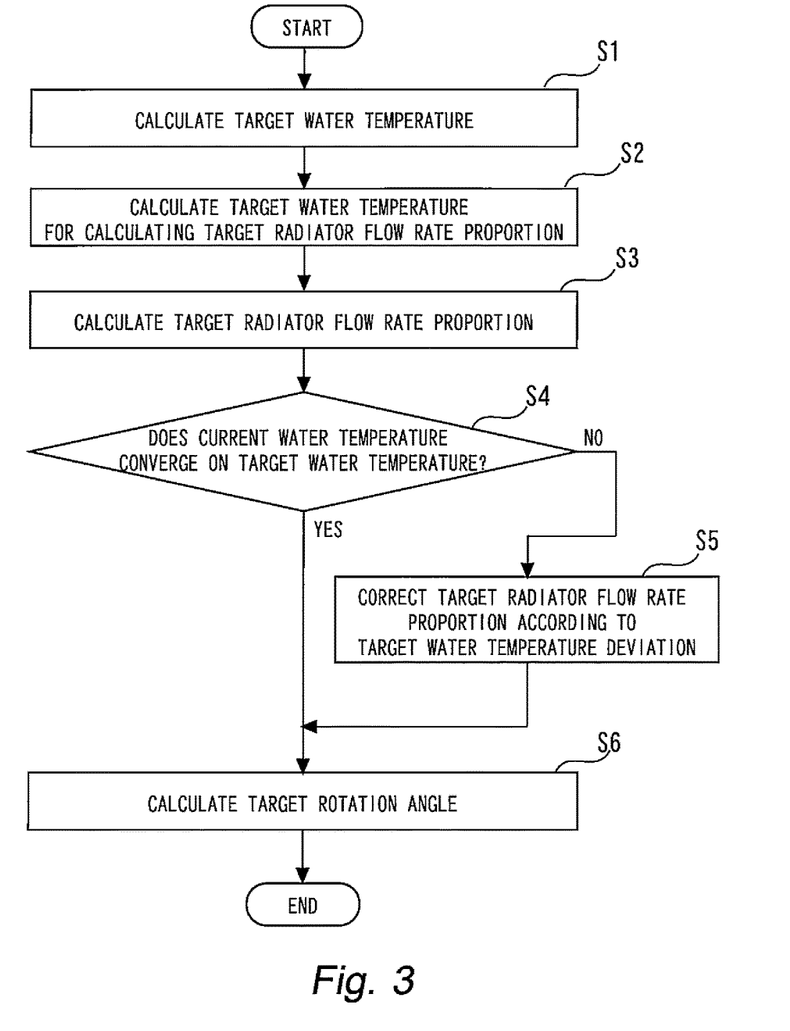
FIG. 3 is a flowchart illustrating a control flow of temperature control by an ECU.

FIG. 3 is a flowchart illustrating a control flow of the temperature control by the ECU 40. The ECU 40 repeatedly executes a routine represented by this control flow at predetermined control periods that correspond to the clock speed of the ECU.

According to a routine shown in FIG. 3, first a target water temperature of the engine cooling water is calculated (step S1). Specifically, a current engine load and engine speed are calculated using, e.g., signals of the crank angle sensor 28 and the accelerator opening degree sensor 30. Further, using a map in which target water temperatures are defined taking the engine load and engine speed as arguments, a target water temperature that corresponds to the calculated current engine load and engine speed is specified.

Next, a target water temperature for calculating a target radiator flow rate proportion is calculated (step S2). Specifically, a radiator water temperature that is the water temperature inside the radiator 20 is detected. The target water temperature for calculating the target radiator flow rate proportion is then calculated by using the detected radiator water temperature to correct the target water temperature calculated in the aforementioned step S1. Note that, the higher that the radiator water temperature is, the lower the value that is calculated as the target water temperature for calculating the target radiator flow rate proportion.

Next, a target radiator flow rate proportion is calculated (step S3). Note that the term "target radiator flow rate proportion" used here refers to an opening ratio of the discharge port 18a that serves as a target flow rate proportion, when the flow rate in a state in which the discharge port 18a that is connected to the radiator 20 is opened fully is taken as 100%. The ECU 40 stores a map which defines target radiator flow rate proportions taking the target water temperature and the engine load as arguments. In the map, the higher that the engine load is, the larger the value that the target radiator flow rate proportion is specified as. Specifically, using the aforementioned map, a target radiator flow rate proportion is specified that corresponds to the corrected target water temperature that is corrected in step S2 and the current engine load.

Next, the ECU 40 determines whether or not the current water temperature detected by the temperature sensor 26 is converging on the target water temperature that is calculated in the aforementioned step S1 (step S4). If it is determined as a result that the current water temperature is not converging on the target water temperature, the operation transitions to the next step to correct the target radiator flow rate proportion in accordance with a target water temperature deviation (step S5). Specifically, a deviation in the current water temperature relative to the target water temperature is calculated as a target water temperature deviation. The larger the value that is calculated for the target water temperature deviation, the larger the value to which the target radiator flow rate proportion is corrected.

If it is determined that the current water temperature is converging on the target water temperature in the processing in the aforementioned step S4, or after the processing in the aforementioned step S5 is performed, the operation transitions to the next step to calculate a target rotation angle (step S6). Specifically, a target value of the rotation angle of the multifunction valve 18 is calculated such that the opening ratio of the discharge port 18a of the multifunction valve 18 becomes the calculated target radiator flow rate proportion.

Thus, according to the routine illustrated in FIG. 2, the rotation angle of the multifunction valve 18 for causing the current water temperature to approach the target water temperature can be accurately calculated.

The auxiliary equipment control is control that circulates coolant to a heat exchanger such as the device(s) 22 or the heater 24, and more specifically is control that controls the opening degree of the branch channel 16b or 16c. Where there is a request to circulate coolant to the device(s) 22, the ECU 40 causes the rotation angle of the rotor of the multifunction valve 18 to move within a range from the region e to the region g or from the region b to the region a, while if there is no request to circulate coolant to the device(s) 22, the ECU 40 causes the rotation angle of the rotor to move within a range from the region c to the region d. According to this control, since coolant can be circulated to the device(s) 22 by adjusting the opening degree of the branch channel 16b in accordance with a request, engine oil or EGR gas can be cooled by heat exchange between the coolant and fluid flowing through the device(s) 22, and thus fuel consumption can be improved.

Further, where there is a request to circulate coolant to the heater 24, that is, when the switch 32 is turned on, the ECU 40 actuates the rotor of the multifunction valve 18 so that the rotation angle of the rotor is within a range from the region c to the region a, while if there is not the relevant request, that is, when the switch 32 is turned off, the ECU 40 actuates the rotor so that the rotation angle of the rotor is within a range from the region d to the region g. According to this control, the opening degree of the branch channel 16c can be adjusted in accordance with an on/off request with respect to the heater 24 to thereby cause coolant to circulate in the heater 24, and hence the air inside the vehicle cabin can be heated by heat exchange between the coolant and air for heating the vehicle cabin.

(Regarding Normal Engine Stopping-Time Control)

The normal engine stopping-time control is control that actuates the rotor of the multifunction valve 18 so that the rotation angle of the rotor is at the reference position in region a, and also completely stops the engine. Unlike the short-time engine stopping, because the normal engine stopping is not accompanied by automatic restarting in a short time period, it is not necessary to continue operation of the multifunction valve 18. According to the normal engine stopping-time control, the respective opening degrees of the branch channels 16a to 16c are all fixed at the maximum opening degree at the time of complete stopping of the engine 10, and hence it is possible to meet a need for ensuring safety and also improve the maintenance characteristics during engine stopping.

Characteristic Operations in First Embodiment

According to the valve control using the multifunction valve 18, since it is possible to perform the temperature control or the warm-up control simultaneously with the auxiliary equipment control, it is possible to achieve compatibility between engine performance and performance of auxiliary equipment such as air-conditioning equipment. However, the following problem exists with regard to the valve control using the multifunction valve 18 when stopping the engine 10. That is, according to the normal engine stopping in which the ignition is turned off by the driver and the engine is completely stopped, the position of the rotation angle of the rotor of the multifunction valve 18 is caused to move to the reference position by the above-described normal engine stopping-time control. However, if the aforementioned normal engine stopping-time control is performed during the short-time engine stopping in which the ignition is kept turned on, the position of the rotation angle of the rotor of the multifunction valve 18 will be caused to move to the reference position. Therefore, when the engine 10 is restarted, it will be necessary to again cause the position of the rotation angle of the rotor of the multifunction valve 18 to move to a position that is in accordance with the operating state. For example, if short-time engine stopping is performed during execution of temperature control in which the rotor is being operated so that the rotation angle of the rotor is in the region g, the rotation angle of the rotor will be caused to move from the region g to the region a accompanying stopping of the temperature control. Subsequently, if restarting is performed a short time thereafter, an operation will be required to return the rotation angle of the rotor again to the region g from the region a accompanying the start of the temperature control. In this series of operations during short-time engine stopping and restarting, a time period is required from the time the engine is restarted until the rotor of the multifunction valve 18 again rotates as far as the predetermined rotation angle, and the controllability deteriorates during that time period.

Therefore, according to the system of the present embodiment a configuration is adopted in which, with respect to the valve control with respect to stopping the engine 10, a distinction is made between the normal engine stopping and the short-time engine stopping, and different control is executed for these two kinds of engine stopping. More specifically, when the stopping of the engine 10 is the normal engine stopping, the ECU 40 causes the rotation angle of the rotor of the multifunction valve 18 to move to the reference position of the region a and executes the normal engine stopping-time control that stops the engine. On the other hand, when the stopping of the engine 10 is the short-time engine stopping, the ECU 40 stops the engine while continuing the operating-time control that is being executed immediately prior to the time that the engine 10 is stopped. According to this kind of control, since the rotor is operated so that the rotation angle of the rotor moves in accordance with the coolant temperature during engine stopping according to the short-time engine stopping also, it is possible to suppress the occurrence of a situation in which the rotation angle of the rotor is caused to move by a large amount when restarting the engine 10 and the controllability therefore deteriorates.

Note that, with respect to continuing the temperature control during short-time engine stopping, although a configuration may be adopted in which the opening degrees of the branch channels 16b and 16c are retained in the states thereof in accordance with the auxiliary equipment control immediately prior to stopping, it is more preferable to continue execution of the auxiliary equipment control. Here, if the temperature control is being continued during short-time engine stopping, for example, if a request to circulate coolant to the heater 24 is issued after being in a state in which the aforementioned request is not issued, the rotation angle of the rotor is caused to move from the region g to the region a and the temperature control is continued. According to such control, the occurrence of a situation in which the rotation angle of the rotor is caused to move by a large amount when restarting the engine 10 can be effectively suppressed.

Further, with respect to continuing the temperature control as the operating-time control during short-time engine stopping, it is preferable to continue driving the water pump 12. By this means, coolant can be forcibly circulated to the radiator 20 even during engine stopping according to the short-time engine stopping, and it is therefore possible to accurately bring the coolant temperature near to the target temperature.

Specific Processing in First Embodiment

Figure 4:
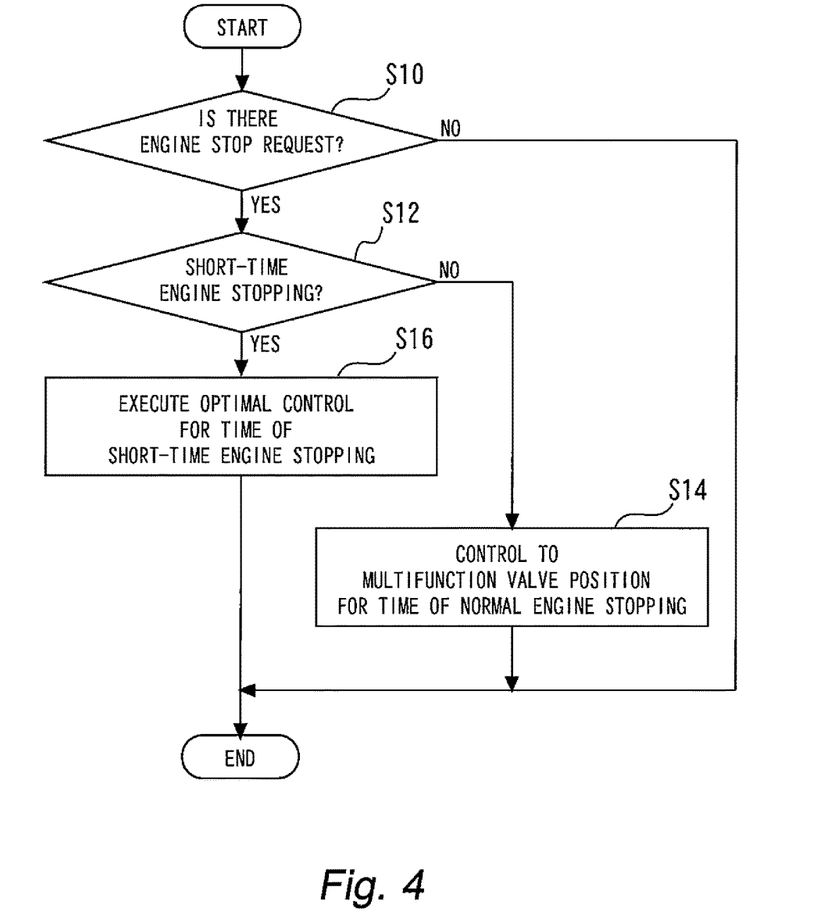
FIG. 4 is a flowchart illustrating a control flow of valve control by an ECU.

Next, specific processing of the valve control that is executed in the cooling apparatus of the present embodiment will be described. FIG. 4 is a flowchart illustrating a control flow of the valve control by the ECU 40. The ECU 40 repeatedly executes a routine represented by this control flow at predetermined control periods that correspond to the clock speed of the ECU.

In a routine shown in FIG. 4, first, the ECU 40 determines whether or not there is an engine stop request (step S10). If it is determined as a result that there is not an engine stop request, the present routine is ended. On the other hand, if it is determined in the aforementioned step S10 that there is an engine stop request, the operation shifts to the next step in which the ECU 40 determines whether the current state is a state in which a request to perform short-time engine stopping is being executed (step S12). Specifically, the ECU 40 determines whether or not, in a state in which the ignition is turned on, a flag for idling stop-and-start control is "on", or whether a request to perform hybrid intermittent operation has been issued. If it is determined as a result that there is no request to perform short-time engine stopping, the ECU 40 determines that the request is for normal engine stopping. The operation then transitions to the next step in which the position of the rotation angle of the rotor is controlled to the multifunction valve position for a time of normal engine stopping (step S14). Specifically, the normal engine stopping-time control is executed and the rotation angle of the rotor of the multifunction valve 18 is returned to the reference position. By this means, the branch channels 16a, 16b and 16c are opened.

On the other hand, if it is determined in the aforementioned step S12 that there is a request to perform short-time engine stopping, the operation transitions to the next step to execute optimal control for a time of short-time engine stopping (step S16). Specifically, the operating-time control that is being executed immediately prior to the short-time engine stopping is continued.

Thus, according to the cooling apparatus of the present embodiment it is possible to suppress a deterioration in the controllability of the cooling apparatus that is caused by short-time engine stopping.

In the cooling apparatus of the first embodiment that is described above, as the normal engine stopping-time control, control is performed that returns the rotation angle of the rotor of the multifunction valve 18 to the reference position and fully opens all of the branch channels 16a, 16b and 16c. However, operation of the multifunction valve 18 as the normal engine stopping-time control is not limited thereto. That is, a configuration may also be adopted that, when there is a request to thermally insulate the engine 10 during normal engine stopping, where there is a request with respect to, e.g., the device(s) 22 or the heater 24, moves the position of the rotation angle of the rotor of the multifunction valve 18 to a rotational position corresponding to the opening degrees of the branch channels 16a, 16b and 16c that are in accordance with the relevant request. This similarly applies with respect to a cooling apparatus of a second embodiment that is described later.

Further, although the configuration of the cooling apparatus of the first embodiment that is described above includes the electric-motor-driven water pump 12, the configuration of the cooling apparatus may include a mechanical water pump that adopts rotations of the engine 10 as motive power. Note that, where utilizing a mechanical water pump, although driving of the water pump cannot be continued during short-time engine stopping, it is possible to continue temperature control by means of a convective effect that arises inside the coolant circulation channel. This similarly applies with respect to the cooling apparatus of the second embodiment that is described later.

Further, in the foregoing description of the cooling apparatus of the first embodiment, a configuration is described that includes the multifunction valve 18 that is capable of regulating circulation of the engine cooling water to the radiator 20, the device(s) 22 and the heater 24, respectively. However, the configuration of a valve to which embodiments of the present invention can be applied is not limited thereto, and as long as the valve can regulate circulation of the engine cooling water to at least the radiator, the valve need not be configured as a multifunction valve that includes a plurality of discharge ports. Further, where the valve is configured as a multifunction valve, as long as the valve includes a discharge port that is connected to the radiator 20, the number and connection destinations of the other discharge ports are not particularly limited. This similarly applies with respect to the cooling apparatus of the second embodiment that is described later.

Furthermore, in the foregoing description of the cooling apparatus of the first embodiment, a configuration is described that includes the multifunction valve 18 having the discharge ports 18a to 18c. However, a valve to which embodiments of the present invention can be applied is not limited to a multifunction valve. For example, a configuration may also be adopted in which a valve that opens/closes the discharge port 18a that is connected to the radiator 20, a valve that opens/closes the discharge port 18b that is connected to the device(s) 22, and a valve that opens/closes the discharge port 18c that is connected to the heater 24 are provided as independent valves. This similarly applies with respect to the cooling apparatus of the second embodiment that is described later.

Further, although in the foregoing description of the cooling apparatus of the first embodiment, automatic stopping by means of idling stop-and-start control is described as an example of short-time engine stopping, control that is capable of realizing short-time engine stopping is not limited thereto. That is, as long as the automatic stopping is automatic stopping of the engine 10 in a state in which the ignition is kept turned on, for example, the automatic stopping may be automatic stopping of intermittent stopping operation of an engine in a hybrid vehicle. This similarly applies with respect to the cooling apparatus of the second embodiment that is described later.

Note that, in the cooling apparatus of the first embodiment described above, the first circulation channel corresponds to "first coolant circulation channel" of the first embodiment of the present invention, the radiator 20 corresponds to "first heat exchanger" of the first embodiment of the present invention, the multifunction valve 18 corresponds to "valve" of the first embodiment of the present invention, the operating-time control corresponds to "first control" of the first embodiment of the present invention, the normal engine stopping-time control corresponds to "second control" of the first embodiment of the present invention, the idling stop-and-start control corresponds to "automatic stop/start control" of the first embodiment of the present invention, and the ECU 40 corresponds to "control apparatus" of the first embodiment of the present invention.

Further, in the cooling apparatus of the first embodiment described above, the second circulation channel or third circulation channel corresponds to "second coolant circulation channel" of the fifth embodiment of the present invention, the opening degree on the branch channel 16a side corresponds to "first opening degree" of the fifth embodiment of the present invention, the opening degree on the branch channel 16b or branch channel 16c side corresponds to "second opening degree" of the fifth embodiment of the present invention, and the device(s) 22 or heater 24 corresponds to "second heat exchanger" of the fifth embodiment of the present invention.

Second Embodiment

Next, a second embodiment of the present invention will be described. A cooling apparatus of the second embodiment can be realized by using the hardware configuration illustrated in FIG. 1, and causing the ECU 40 to execute a routine shown in FIG. 5 that is described later.

Features of Second Embodiment

In the cooling apparatus of the first embodiment that is described above, as optimal control of the multifunction valve 18 during short-time engine stopping, the operation control that is being executed at the time of the short-time engine stopping is continued. During a period in which warm-up control is being performed, the branch channel 16a is controlled to constantly be a fixed opening degree (fully closed). Further, since warming up does not proceed while engine stopping is being performed, a particular problem does not arise even if the opening degree of the branch channel 16a during short-time engine stopping is retained in the state thereof (that is, fully closed) immediately prior to performing the short-time engine stopping.

Therefore, according to a cooling apparatus of the second embodiment, a configuration is adopted that, where warm-up control is being performed as the operating-time control during short-time engine stopping, retains the rotation angle of the rotor of the multifunction valve 18 during short-time engine stopping in the state thereof immediately prior to the start of the short-time engine stopping. According to this control, since the rotation angle of the rotor is not returned to the reference position during engine stopping by means of short-time engine stopping, it is possible to suppress the occurrence of a situation in which the rotation angle of the rotor is caused to move by a large amount when restarting the engine 10 and the controllability deteriorates.

Specific Processing in Second Embodiment

Figure 5:
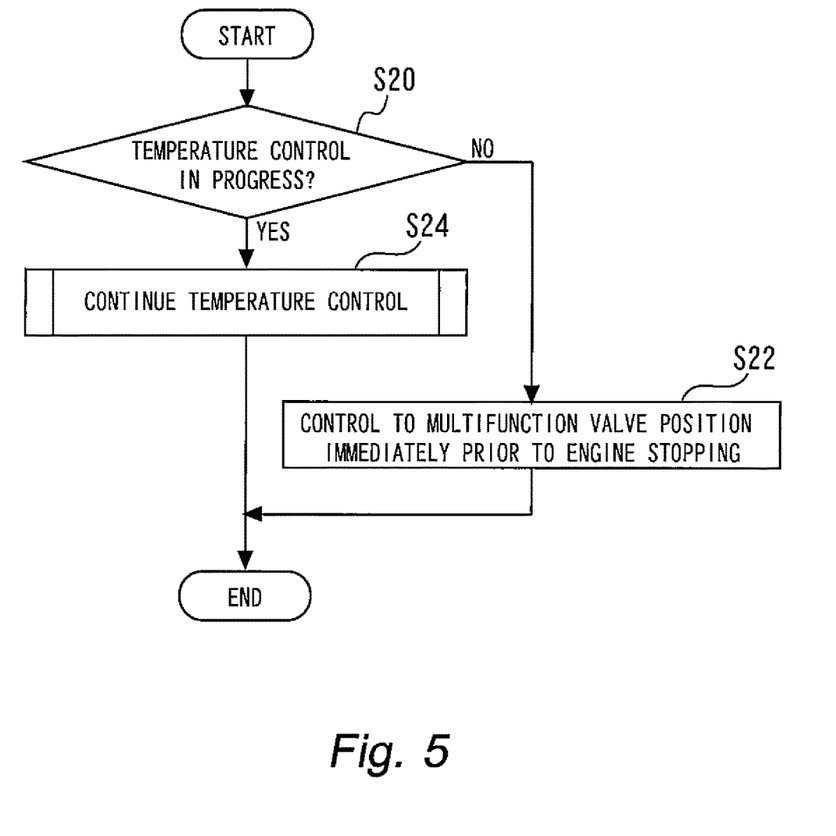
FIG. 5 is a flowchart illustrating a control flow of optimal control during short-time engine stopping that is performed by an ECU.

Next, specific processing of the valve control that is executed in the cooling apparatus of the present embodiment will be described. FIG. 5 is a flowchart illustrating a control flow of optimal control during short-time engine stopping that is executed by the ECU 40. The routine illustrated in FIG. 5 is executed when the processing in step S14 of the routine illustrated in the aforementioned FIG. 4 is performed.

According to the routine illustrated in FIG. 5, first, it is determined whether or not temperature control is being executed (step S20). If it is determined as a result that temperature control is not being executed, the operation transitions to the next step to retain the rotation angle of the rotor of the multifunction valve 18 at the position thereof immediately prior to engine stopping (step S22).

On the other hand, if it is determined by the processing in the aforementioned step S20 that temperature control is being executed, the operation transitions to the next step to continue the temperature control in accordance with the routine illustrated in FIG. 3 (step S24).

Thus, according to the cooling apparatus of the present embodiment it is possible to suppress a deterioration in the controllability of the cooling apparatus due to short-time engine stopping.

In the cooling apparatus of the second embodiment that is described above, a configuration is adopted that, when temperature control is not being performed as optimal control during short-time engine stopping, the rotation angle of the rotor of the multifunction valve 18 is retained at the position thereof immediately prior to the engine stopping. However, control that can be executed where temperature control is not being executed is not limited thereto. For example, a configuration may be adopted in which, by continuing to execute the auxiliary equipment control, the rotation angle of the rotor of the multifunction valve 18 is caused to move in accordance with an operation request with respect to the auxiliary equipment. According to such control, even where the switch 32 is switched on or off during short-time engine stopping, the rotation angle of the rotor is caused to move in accordance with the relevant on or off request with respect to the heater 24 before restarting the engine, and thus the controllability of the cooling apparatus when restarting the engine can be improved.

However, where temperature control is not being executed during short-time engine stopping, if the rotation angle of the rotor of the multifunction valve 18 is at the water stoppage position, preferably the rotation angle of the rotor of the multifunction valve 18 during the short-time engine stopping is retained at the water stoppage position. The rotation angle of the rotor can be rapidly moved from the water stoppage position to a rotation angle corresponding to any request where a request is issued to circulate coolant to the device(s) 22 or the heater 24. Consequently, even where the aforementioned request is issued after restarting from short-time engine stopping, a deterioration in the controllability of the cooling apparatus can be suppressed and the fuel consumption can be improved. Note that in the cooling apparatus of the second embodiment that is described above, the ECU 40 corresponds to "retaining apparatus" of the sixth embodiment of the present invention.

The invention claimed is:

1. A cooling apparatus for an internal combustion engine configured to be capable of executing an automatic stop/start control that automatically stops the internal combustion engine when a predetermined stopping condition is established, and automatically restarts the engine when a predetermined restarting condition is established during automatic stopping, the cooling apparatus comprising:
    a first coolant circulation channel for returning a coolant that passed through a main body of the internal combustion engine to the main body of the internal combustion engine after allowing the coolant to exchange heat with a first heat exchanger;
    an electric-motor-driven valve that is provided partway along the first coolant circulation channel; and
    a control apparatus including at least one input/output interface, memory, and a CPU configured to execute a first control and a second control stored in the memory, the first control actuates the valve in accordance with a temperature of the coolant during operation of the internal combustion engine, and the second control actuates the valve to a reference position when the internal combustion engine has completely stopped;
    wherein the control apparatus is configured so that when automatic stopping is performed by the automatic stop/start control during execution of the first control, the control apparatus continues to execute the first control during the automatic stopping.

2. The cooling apparatus for an internal combustion engine according to claim 1, wherein the first control includes a temperature control that actuates the valve so as to bring the temperature of the coolant near to a target temperature.

3. The cooling apparatus for an internal combustion engine according to claim 1, further comprising:
    an electric water pump that circulates the coolant in the first coolant circulation channel,
    wherein the control apparatus is configured to drive the electric water pump during execution of the first control.

4. The cooling apparatus for an internal combustion engine according to claim 1, wherein the first control includes a warm-up control that, when the temperature of the coolant is lower than a predetermined warm-up temperature, actuates the valve so that circulation of the coolant in the first coolant circulation channel is stopped.

5. The cooling apparatus for an internal combustion engine according to claim 1, further comprising:
    a second coolant circulation channel for returning coolant that passed through the main body of the internal combustion engine to the main body of the internal combustion engine after allowing the coolant to exchange heat with a second heat exchanger;
    wherein:
    the valve is provided partway along the second coolant circulation channel, such that the valve has a first coolant circulation channel side and a second coolant circulation channel side;
    the valve is configured as a rotary valve that comprises therein a rotatable rotor, and is configured so that a first opening degree on the first coolant circulation channel side and a second opening degree on the second coolant circulation channel side change in accordance with a rotational position of the rotor; and
    the first control includes an auxiliary equipment control that adjusts the second opening degree in response to a request to circulate coolant in the second heat exchanger.

6. The cooling apparatus for an internal combustion engine according to claim 5,
    wherein the rotary valve is configured to change each of the first opening degree and the second opening degree from a fully-open opening degree to a fully-closed opening degree by rotating the rotor from the reference position at which both of the first opening degree and the second opening degree are the fully-open opening degree, and to change each of the first opening degree and the second opening degree from the fully-closed opening degree to the fully-open opening degree by further rotating the rotor;
    the control apparatus further configured to, when automatic stopping by the automatic stop/start control is performed during execution of the first control, if the rotational position of the rotor is a water stoppage position at which both of the first opening degree and the second opening degree become the fully-closed opening degree, retain the rotational position of the rotor at the water stoppage position during the automatic stopping.

7. The cooling apparatus for an internal combustion engine according to claim 1, wherein the automatic stop/start control includes an idling stop-and-start control.

* * * * *